(12) United States Patent
Arai et al.

(10) Patent No.: US 11,885,479 B2
(45) Date of Patent: Jan. 30, 2024

(54) LIGHT-EMITTING EMBLEM

(71) Applicant: TOYODA GOSEI CO., LTD., Kiyosu (JP)

(72) Inventors: Yuto Arai, Kiyosu (JP); Hirotaka Fukui, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/147,034

(22) Filed: Dec. 28, 2022

(65) Prior Publication Data

US 2023/0250941 A1 Aug. 10, 2023

(30) Foreign Application Priority Data

Feb. 4, 2022 (JP) ................. 2022-016163

(51) Int. Cl.
*F21V 19/00* (2006.01)
*F21V 7/00* (2006.01)
*B60Q 1/00* (2006.01)
*B60R 13/00* (2006.01)
*F21W 104/00* (2018.01)
*F21Y 115/10* (2016.01)

(52) U.S. Cl.
CPC .......... *F21V 19/003* (2013.01); *B60Q 1/0017* (2013.01); *B60R 13/005* (2013.01); *F21V 7/0008* (2013.01); *F21W 2104/00* (2018.01); *F21Y 2115/10* (2016.08)

(58) Field of Classification Search
CPC ...... B60Q 1/0017–0023; B60R 13/005; F21V 7/0008–0016; F21V 19/003–0055; F21W 2104/00; F21Y 2115/10
See application file for complete search history.

(56) References Cited

U.S. PATENT DOCUMENTS 10,191,201 B2 * 1/2019 Kuramitsu ............ B60R 13/005
10,730,267 B2 * 8/2020 Dellock ................ B32B 15/085
10,795,068 B1 * 10/2020 Dellock ............... G02B 6/0008

FOREIGN PATENT DOCUMENTS

JP 2011-093378 A 5/2011

* cited by examiner

*Primary Examiner* — Jason M Han
(74) *Attorney, Agent, or Firm* — POSZ LAW GROUP, PLC

(57) ABSTRACT

A light-emitting emblem includes a light-emitting element as a light source, a housing that houses the light-emitting element and includes an opening, and a cover. The cover includes an emblem on a surface thereof and a light-emitting portion on the surface to allow light emitted from the light-emitting element to be extracted therethrough. The cover is attached to the housing so as to cover the opening. Also included is a first rib on the housing and/or a second rib on the cover, the first rib extending from the housing toward the cover, and the second rib extending from the cover toward the housing.

2 Claims, 4 Drawing Sheets

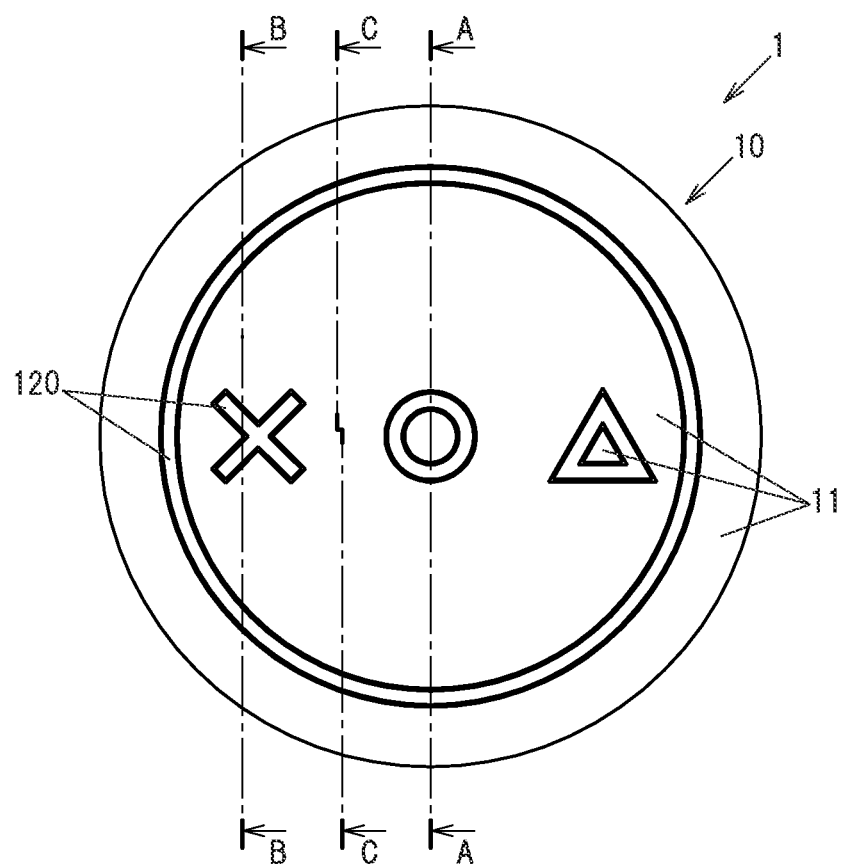

FIG. 2A
FIG. 2B
FIG. 2C
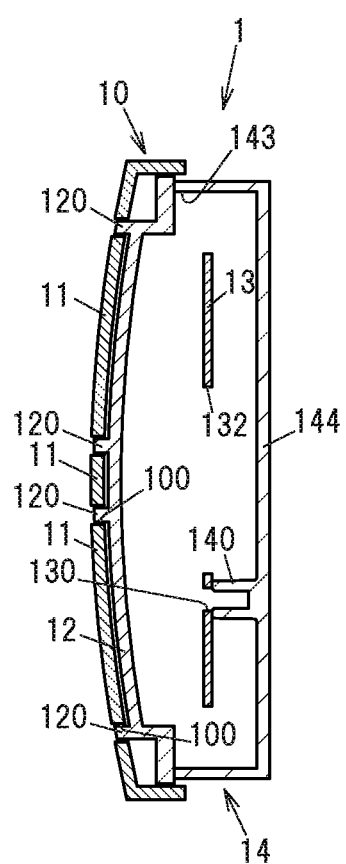
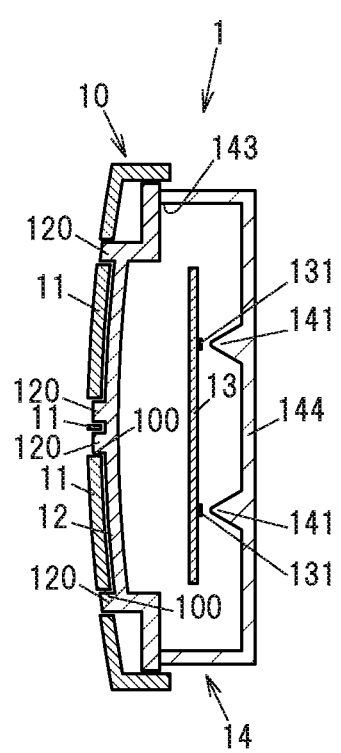
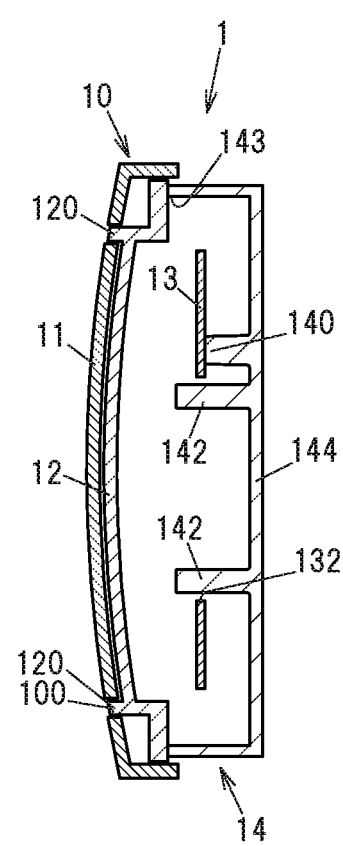

LIGHT-EMITTING EMBLEM

CROSS-REFERENCE TO RELATED APPLICATIONS

The present patent application claims the priority of Japanese patent application No. 2022/016163 filed on Feb. 4, 2022, and the entire contents of Japanese patent application No. 2022/016163 are hereby incorporated by reference.

TECHNICAL FIELD

The present invention relates to a light-emitting emblem and, in particular, to a light-emitting emblem installed on vehicle surfaces such as a front grille.

BACKGROUND ART

A light-emitting emblem is known which is attached to a front grille of a vehicle and can be illuminated (see Patent Literature 1). The light-emitting emblem described in Patent Literature 1 is configured such that a light-emitting device having a case and LEDs housed therein is installed on a back side of the emblem, and the light-emitting device and the emblem are attached to the front grille of the vehicle by being supported by a bracket.

CITATION LIST

Patent Literature

Patent Literature 1: JP 2011/93378 A

SUMMARY OF INVENTION

However, according to the structure of the light-emitting emblem described in Patent Document 1, when the light-emitting emblem receives an impact in the thickness direction due to a vehicle collision or the like, the emblem can bend greatly toward the light-emitting device on the back side, so that it may be destroyed.

It is an object of the invention to provide a light-emitting emblem that is less likely to be destroyed even when receiving the impact in the thickness direction due to the vehicle collision, etc.

An aspect of the invention provides a light-emitting emblem defined in (1) to (3) below.

(1) A light-emitting emblem, comprising:
a light-emitting element as a light source;
a housing that houses the light-emitting element and comprises an opening;
a cover comprising an emblem on a surface thereof and a light-emitting portion on the surface to allow light emitted from the light-emitting element to be extracted therethrough, the cover being attached to the housing so as to cover the opening; and
at least one of a first rib on the housing and a second rib on the cover, the first rib extending from the housing toward the cover, and the second rib extending from the cover toward the housing.

(2) The light-emitting emblem defined in (1), wherein the light-emitting element is mounted on a printed circuit board, wherein a surface of the printed circuit board on which the light-emitting element is mounted faces a bottom portion of the housing, and wherein light emitted from the light-emitting element and reflected by an inner surface of the housing and the printed circuit board is extracted through the light-emitting portion.

(3) The light-emitting emblem defined in (1) or (2), wherein the housing comprises a protrusion that is located on the bottom portion of the housing in a region facing the light-emitting element and that protrudes from an inside of the bottom portion of the housing.

Advantageous Effects of Invention

According to an embodiment of the invention, a light-emitting emblem can be provided that is less likely to be destroyed even when receiving the impact in the thickness direction due to the vehicle collision, etc.

BRIEF DESCRIPTION OF DRAWINGS

FIG. 1 is a front view showing a light-emitting emblem in an embodiment of the present invention.

FIGS. 2A, 2B and 2C are cross-sectional views showing the light-emitting emblem in the embodiment of the invention cut along lines A-A, B-B and C-C, respectively, in FIG. 1.

DESCRIPTION OF EMBODIMENTS (Configuration of a Light-Emitting Emblem)

Figure 3:
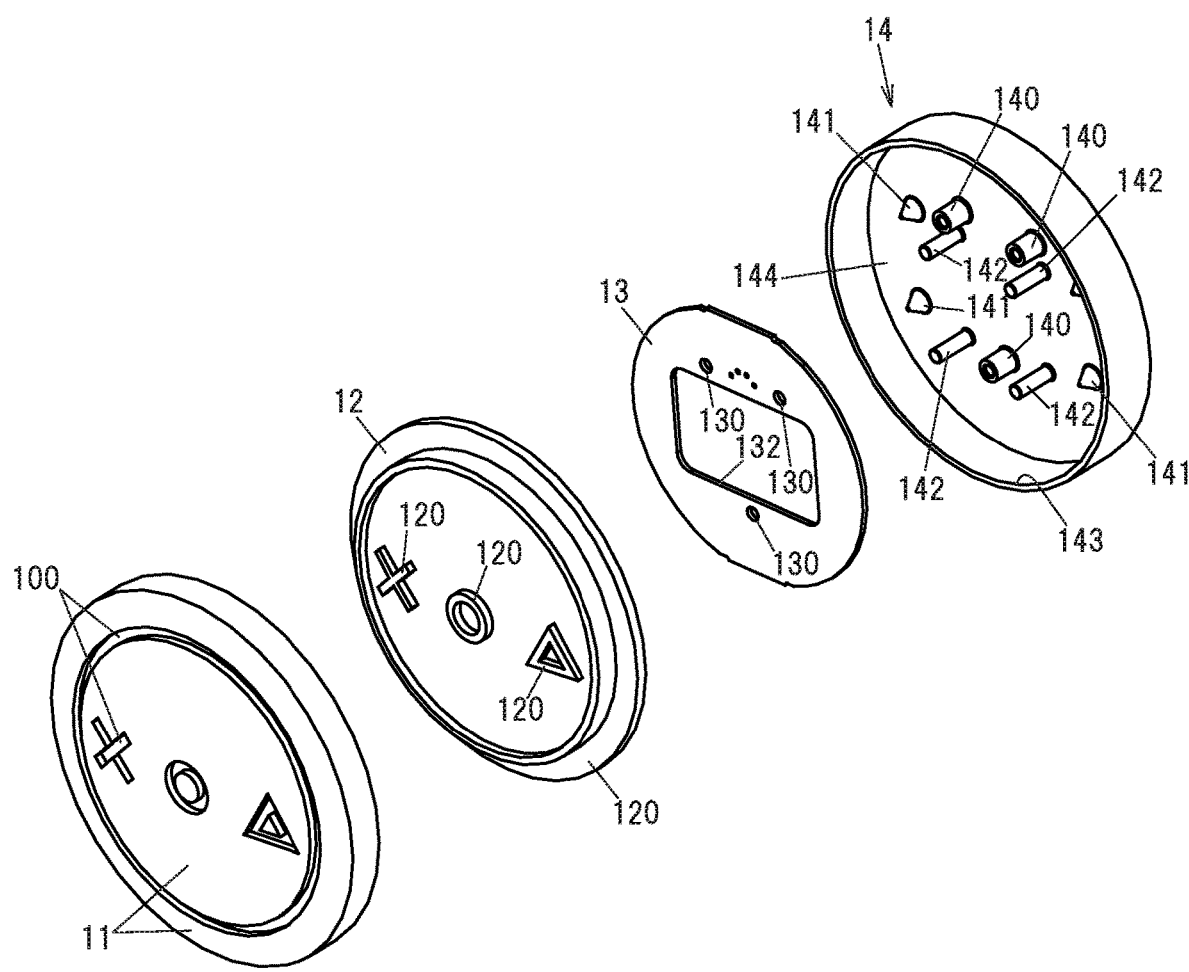
FIG. 3 is an exploded perspective view showing the light-emitting emblem in the embodiment of the invention.

FIG. 1 is a front view showing a light-emitting emblem 1 in an embodiment of the invention. FIGS. 2A, 2B and 2C are cross-sectional views showing the light-emitting emblem 1 cut along lines A-A, B-B and C-C, respectively, in FIG. 1. FIG. 3 is an exploded perspective view showing the light-emitting emblem 1.

The light-emitting emblem 1 includes light-emitting elements 131 as light sources, a housing 14 that houses the light-emitting elements 131 and has an opening 143, a cover 10 that has an emblem on a surface, includes, on said surface, light-emitting portions 120 allowing light emitted from the light-emitting elements 131 to be extracted, and is attached to the housing 14 so as to cover the opening 143, and ribs 142 to suppress damage on the cover 10 that extend from the housing 14 toward the cover 10.

The light-emitting element 131 is a light-emitting element mounted on a printed circuit board 13, and is typically an LED. The printed circuit board 13 is placed so that a surface on which the light-emitting elements 131 are mounted faces a bottom portion 144 of the housing 14. The printed circuit board 13 is fixed to the housing 14, as described later.

Light emitted from the light-emitting elements 131 toward the bottom portion 144 of the housing 14 is reflected by an inner surface of the housing 14 and the printed circuit board 13, then enters an outer lens 12 (described later) and is extracted to the outside through the light-emitting portions 120, hence, brightness uniformity of the light-emitting portions 120 is high. In addition, in the construction of this light-emitting emblem 1, an optical path length from the light-emitting element to the light extraction portion is large and this allows light to be sufficiently diffused inside the light-emitting emblem 1, as compared to when the light-emitting element is arranged directly below the light extraction portion and light is extracted directly. Therefore, sufficiently high brightness uniformity of the light-emitting portions 120 is obtained without increasing a thickness of the housing 14. That is, the housing 14 can be reduced in thickness while ensuring high brightness uniformity of the light-emitting portions 120.

Then, since the thickness of the housing 14 is reduced, the ribs 142 can be shortened. Shortening the ribs 142 improves durability of the ribs 142 against collision (described later), which improves the effect of the ribs 142 to suppress damage on the cover 10 (described later).

Since the light emitted from the light-emitting elements 131 is reflected at the printed circuit board 13, the printed circuit board 13 is preferably a white circuit board using FR-4 or CEM3, etc., which can suppress light absorption. The reflectance of the light emitted from the light-emitting elements 131 by the surface of the printed circuit board 13 is not less than 50%, preferably not less than 80%. On the printed circuit board 13, electronic components such as resistor, capacitor and diode are also mounted in addition to the light-emitting elements 131.

Since the light emitted from the light-emitting elements 131 is reflected at the housing 14, the housing 14 is preferably integrally molded using a resin which can suppress light absorption, such as PC (polycarbonate), ASA (acrylonitrile-styrene-acrylic ester), ABS (acrylonitrile-butadiene-styrene), or AES (acrylonitrile-ethylene-propylene-diene-styrene), etc., which is white. The reflectance of the light emitted from the light-emitting elements 131 by the surface of the housing 14 is not less than 50%, preferably not less than 80%. The housing 14 is preferably formed by molding a white resin from the viewpoint of manufacturing cost, but may be formed of a non-white material of which surface is coated with a white paint.

The housing 14 has bosses 140 to fix the printed circuit board 13 to the housing 14, protrusions 141 to suppress light leakage from the bottom portion 144 of the housing 14, and the ribs 142 to suppress damage on the cover 10.

The boss 140 is a columnar protrusion that extends in a thickness direction from the inner surface of the bottom portion 144 of the housing 14 and has a threaded hole. The printed circuit board 13 can be fixed to the bosses 140 by passing screws through holes 130 on the printed circuit board 13 and tightening the screws into the threaded holes of the bosses 140.

The protrusion 141 is a cone-shaped, or polygonal cone-shaped, protrusion that protrudes from the inner surface of the bottom portion 144 of the housing 14 in the thickness direction. By providing the protrusions 141 on the bottom portion 144 of the housing 14 at positions facing the light-emitting elements 131, the thickness of portions of the bottom portion 144 exposed to the strongest light is increased and leakage light transmitted through the bottom portion 144 can thereby be reduced.

In addition, by reflecting the light emitted from the light-emitting elements 131 at the protrusions 141 and diffusing the light around the protrusions 141, diffusion efficiency inside the housing 14 can be further increased. The protrusions 141 may be arranged so that the light emitted from the light-emitting elements 131 is shone on mainly inclined surfaces of the protrusions 141, not apexes. The light distribution by reflection at the protrusions 141 can be adjusted by the position on which light is mainly shone. A height of the protrusion 141 is, e.g., about 50% of a distance between the bottom portion 144 of the housing 14 and the outer lens 12, and an inclination angle of the inclined surface is about 60°.

The cover 10 has a cover main body 11 that is not transparent to light, and the outer lens 12 that is formed of a light guiding material and has the light-emitting portions 120 exposed on the surface of the cover 10. The cover main body 11 and the outer lens 12 may be integrally molded into one piece or may be separate parts.

The outer lens 12 is placed on the inner side of the cover main body 11, i.e., on the back side of the cover main body 11 when the light-emitting emblem 1 is viewed from the front. Portions of the outer lens 12 are exposed as the light-emitting portions 120 to the outside through gaps 100 of the cover main body 11, and the light emitted from the light-emitting elements 131 and captured by the outer lens 12 is extracted from the light-emitting portions 120. That is, when the light-emitting elements 131 are turned on and lit, light is emitted to the outside from the light-emitting portions 120. The shapes of the cover main body 11 and the light-emitting portions 120 of the outer lens 12 are shown as the emblem on the surface of the cover 10.

The cover main body 11 is formed of, e.g., a resin such as ABS or ASA. The cover main body 11 may be formed by, e.g., molding a resin colored into black, etc., or a paint or plating may be applied to the surface.

The outer lens 12 is formed of a resin transparent to the light emitted from the light-emitting elements 131, such as PMMA (methyl methacrylate) or PC. PMMA with excellent weather resistance is particularly preferable to be used as the material for the outer lens 12. PMMA has the disadvantage of having lower strength than other light guiding materials such as PC and being easily damaged when deformed, but in the construction to suppress damage on the cover 10 using the ribs 142 (described later), damage due to deformation can be suppressed even when PMMA is used for the outer lens. That is, by using, e.g., PMMA as the material of the outer lens 12, it is possible to obtain the cover 10 that weather resistance is excellent and damage due to deformation in the event of collision, etc., is suppressed.

To prevent water, etc., from entering the inside of the light-emitting emblem 1, the outer lens 12 and the housing 14 are preferably joined by welding, etc.

(Construction to Suppress Damage on the Cover)

Next, a configuration in which the ribs 142 provided on the housing 14 are used to suppress damage when the cover 10 is deformed will be described.

The rib 142 is a protrusion having a columnar shape or a plate shape, etc., which extends in the thickness direction from the inner surface of the bottom portion 144 of the housing 14 and is arranged with a tip located close to the cover 10. The rib 142 extends through a hole 132 on the printed circuit board 13 to the cover 10 side.

When the light-emitting emblem 1 placed on a front grille, etc., of a vehicle receives an impact in the thickness direction due to a vehicle collision, etc., the cover 10 is deformed toward the housing 14. At this time, the tips of the ribs 142 butt against the deformed cover 10, which disperses the impact and thus can suppress damage on the cover 10. In the construction illustrated in FIGS. 1 to 3, the tips of the ribs 142 butt against the outer lens 12 when the cover 10 is deformed.

When the light-emitting emblem 1 receives an impact in the thickness direction, the cover 10 bends and its center portion is most displaced. Therefore, to effectively suppress damage on the cover 10, the positions of the ribs 142 in the planar direction are preferably within 35 mm from the center of the housing 14 in the planar direction so that the ribs 142 can support the area around the center of the cover 10.

In addition, to effectively suppress damage on the cover 10, a distance between the tip of the rib 142 and the cover 10 (e.g., a distance between the tip of the rib 142 and the outer lens 12 when the tip of the rib 142 faces the outer lens 12 as shown in FIG. 2C) is preferably not less than 0.5 mm and not more than 2.5 mm.

In addition, to increase durability of the rib 142 against an impact in a length direction without compromising brightness uniformity of the light-emitting portions 120, the length of the rib 142 is preferably not more than 15 mm. When the ribs 142 are short, durability can be ensured without increasing the horizontal cross-sectional area, hence, it is possible to suppress a decrease in brightness uniformity of the light-emitting portions 120 caused by the ribs 142 blocking the optical path.

Figure 4A:
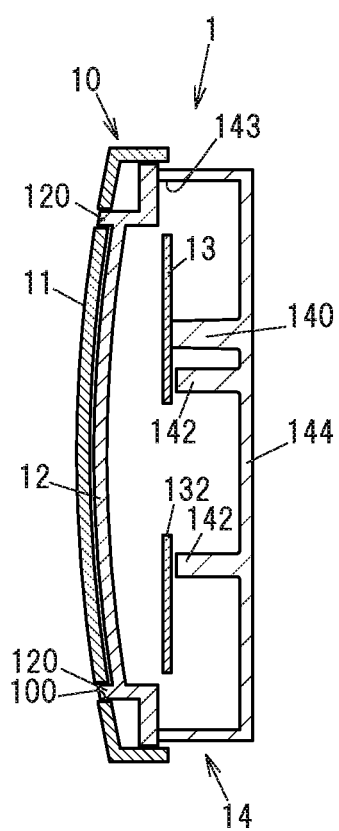
FIGS. 4A and 4B are cross-sectional views respectively showing the constructions of modifications of the light-emitting emblem in the embodiment of the invention.
Figure 4B:
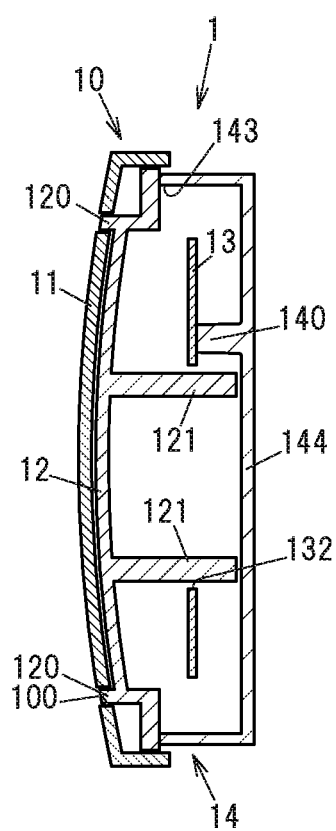

FIGS. 4A and 4B are cross-sectional views respectively showing the constructions of modifications of the light-emitting emblem 1. The cutting positions of the cross sections shown in FIGS. 4A and 4B correspond to the cutting position of the cross section shown in FIG. 2C.

In the construction shown in FIG. 4A, the position of the printed circuit board 13 is closer to the cover 10 than the positions of the tips of the ribs 142, and the surface of the printed circuit board 13 on which the light-emitting elements 131 are mounted faces the tips of the ribs 142. In this case, when the cover 10 is deformed, the cover 10 firstly comes into contact with the printed circuit board 13 fixed to the housing 14, and when the cover 10 is more deformed, the cover 10 comes into contact with the tips of the ribs 142 through the printed circuit board 13.

In the construction shown in FIG. 4A, since the cover 10 when deformed comes into contact with the tips of the ribs 142 through the printed circuit board 13, the ribs 142 can be shortened by the amount of the thickness of the printed circuit board 13. Shortening the ribs 142 improves durability of the ribs 142 against an impact in the length direction, resulting in improved suppression of damage on the cover 10.

In the construction shown in FIG. 4B, in place of the ribs 142 provided on the housing 14, ribs 121 extending from the cover 10 toward the housing 14 are provided as the ribs to suppress damage on the cover 10. The rib 121 extends, e.g., from the outer lens 12 through the hole 132 on the printed circuit board 13 to the housing 14 side. In this case, when the cover 10 is deformed, the tips of the ribs 121 come into contact with the bottom portion 144 of the housing 14 and the impact is dispersed.

Alternatively, the light-emitting emblem 1 may include both the ribs 142 on the housing 14 and the ribs 121 on the cover 10 as the ribs to suppress damage on the cover 10.

In addition, as another modification, a construction in which the printed circuit board 13 is fixed to the cover 10, e.g., the outer lens 12, instead of fixed to the housing 14 may be used. In this case, rigidity of the cover 10 is increased, which results in improved suppression of damage on the cover 10.

(Effects of the Embodiment)

In the light-emitting emblem 1 in the embodiment of the invention, when receiving an impact in the thickness direction due to a vehicle collision, etc., the impact on the cover 10 having the emblem is dispersed through the ribs 142 and damage on the cover 10 can thereby be suppressed.

Although the embodiment of the invention has been described, the invention is not limited to the embodiment described above and the various kinds of modifications can be implemented without departing from the gist of the invention. In addition, the constituent elements in the embodiment can be arbitrarily combined without departing from the gist of the invention.

In addition, the embodiment described above does not limit the invention according to claims. Further, please note that not all combinations of the features described in the embodiment are necessary to solve the problem of the invention.

REFERENCE SIGNS LIST

1 LIGHT-EMITTING EMBLEM
10 COVER
11 COVER MAIN BODY
12 OUTER LENS
120 LIGHT-EMITTING PORTION
121 RIB
13 PRINTED CIRCUIT BOARD
131 LIGHT-EMITTING ELEMENT
14 HOUSING
142 RIB
143 OPENING

The invention claimed is:

1. A light-emitting emblem, comprising:
a light-emitting element as a light source;
a housing that houses the light-emitting element and comprises an opening;
a cover comprising an emblem on a surface thereof and a light-emitting portion on the surface to allow light emitted from the light-emitting element to be extracted therethrough, the cover being attached to the housing so as to cover the opening; and
at least one of a first rib on the housing and a second rib on the cover, the first rib extending from the housing toward the cover, and the second rib extending from the cover toward the housing,
wherein the cover is joined to the housing at an end of the opening,
wherein the light-emitting element is mounted on a printed circuit board,
wherein a surface of the printed circuit board on which the light-emitting element is mounted faces a bottom portion of the housing, and
wherein light emitted from the light-emitting element and reflected by an inner surface of the housing and the printed circuit board is extracted through the light-emitting portion.

2. The light-emitting emblem according to claim 1, wherein the housing comprises a protrusion that is located on the bottom portion of the housing in a region facing the light-emitting element and that protrudes from an inside of the bottom portion of the housing.

* * * * *